No. 800,906. PATENTED OCT. 3, 1905.
C. G. CURTIS.
STEAM BOILER.
APPLICATION FILED FEB. 17, 1904.
5 SHEETS—SHEET 2.
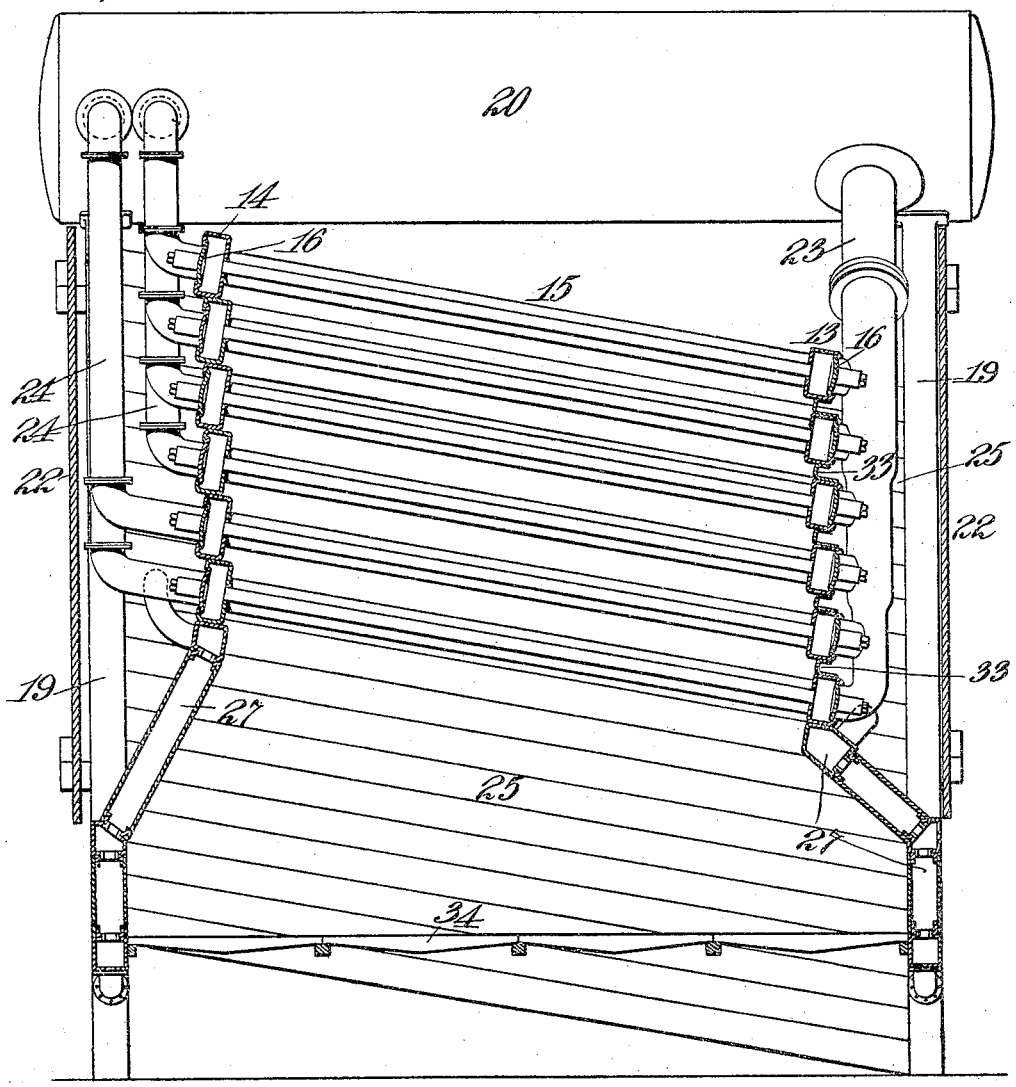
Witnesses:
Jas. F. Coleman
Jno. Robt Taylor
Inventor
Charles G. Curtis
By Dyer & Dyer
Attorneys.

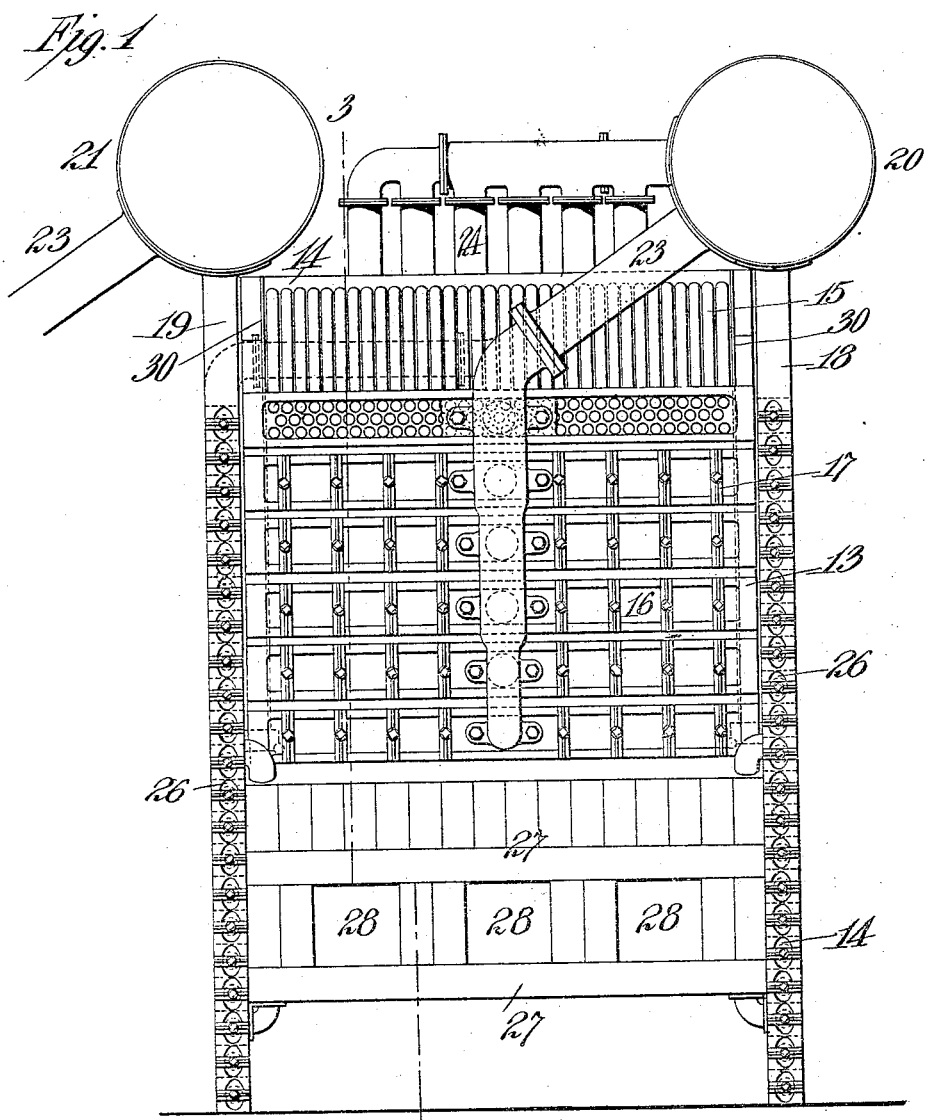

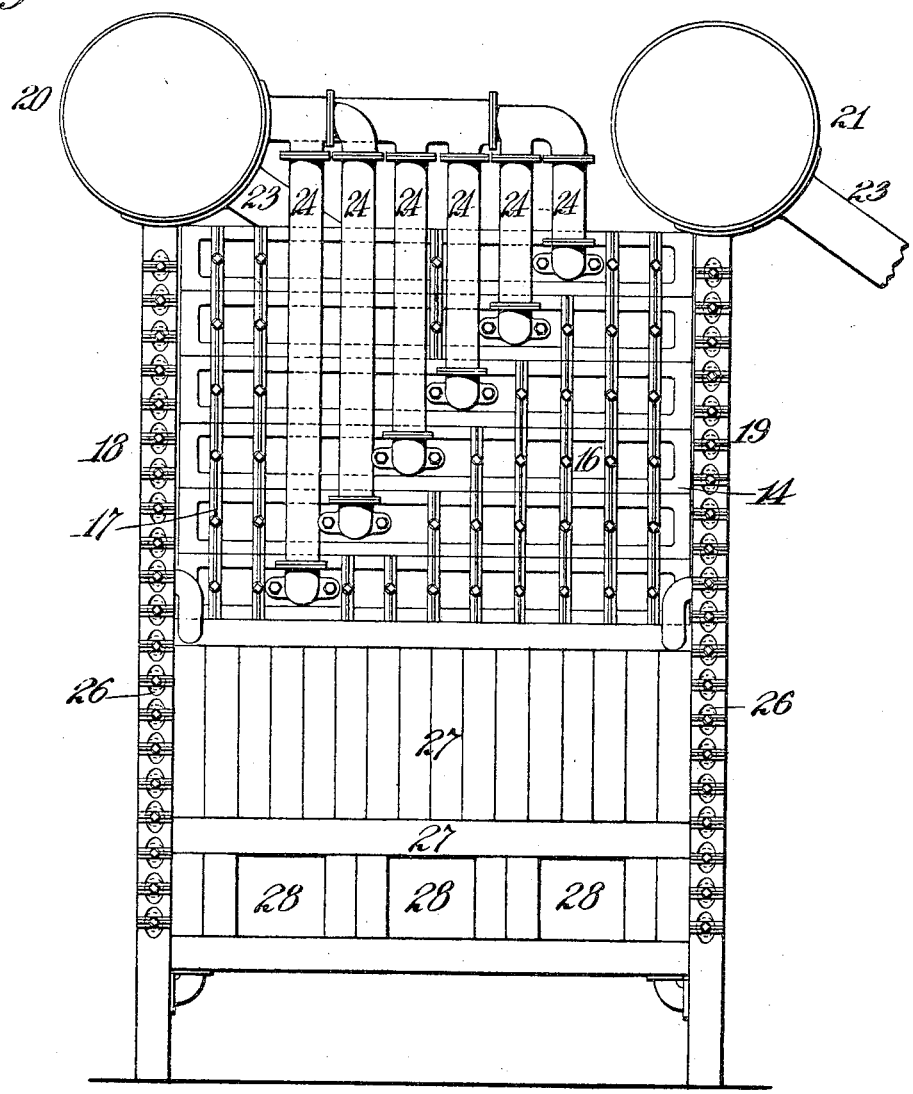

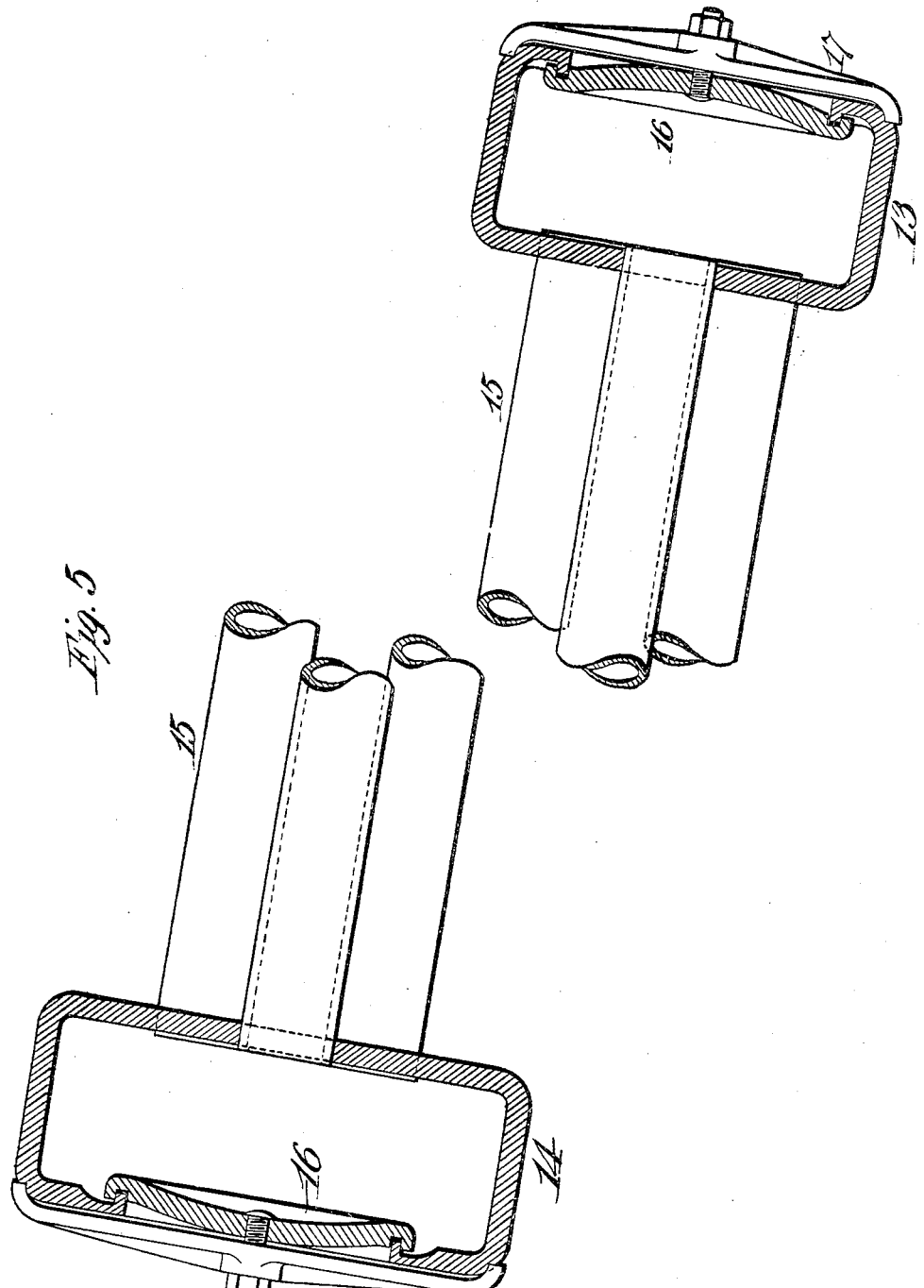

No. 800,906. PATENTED OCT. 3, 1905.
C. G. CURTIS.
STEAM BOILER.
APPLICATION FILED FEB. 17, 1904.
5 SHEETS—SHEET 5.
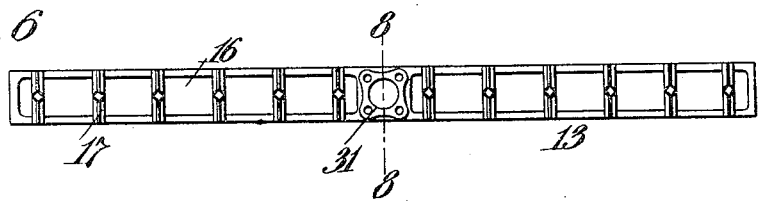
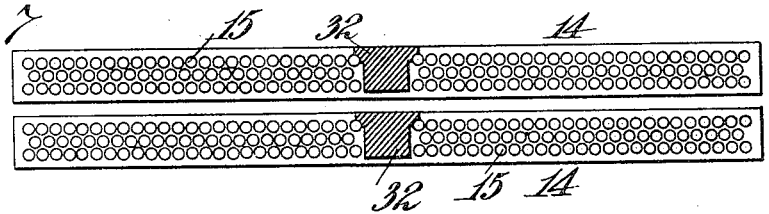
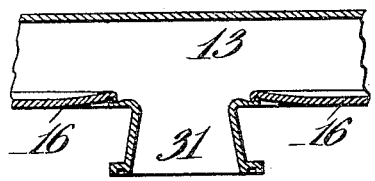
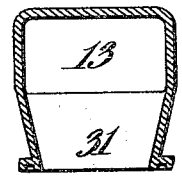
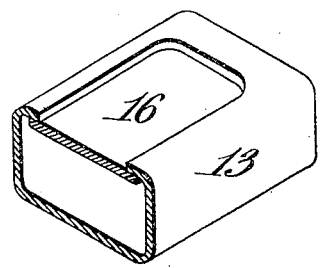
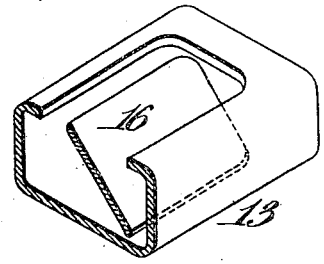
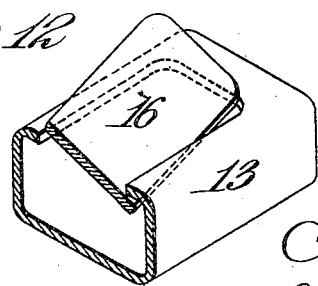
Witnesses:
Jas. F. Coleman
Jno. Robt. Taylor
Inventor
Charles G. Curtis
By Dyer & Dyer
Attorneys.

UNITED STATES PATENT OFFICE.

CHARLES G. CURTIS, OF NEW YORK, N. Y.

STEAM-BOILER.

No. 800,906. Specification of Letters Patent. Patented Oct. 3, 1905.

Application filed February 17, 1904. Serial No. 193,936.

*To all whom it may concern:*

Be it known that I, CHARLES G. CURTIS, a citizen of the United States, residing in the borough of Manhattan, city of New York, State of New York, have invented a certain new and useful Improvement in Steam-Boilers, of which the following is a description.

The object I have in view is to produce a water-tube steam-boiler which will have the maximum grate area relative to the floor-space occupied and which at the same time will possess the following features: first, accessibility of the tubes for internal cleaning and for removal through removable covering-plates; second, absence of baffle-plates, which become warped and destroyed by the heat and collect dust and cinders; third, a close proximity of the tubes so as to afford a comparatively limited area for the escape of the products of combustion, and, fourth, accessibility to the spaces between the tubes to enable their external surfaces to be cleaned from the front or rear of the boiler and preferably without withdrawing the fires.

My present boiler embodies many of the features of invention described and claimed in my application for patent, Serial No. 149,837, filed March 27, 1903, and is designed to be an improvement upon the boiler illustrated and specifically described therein.

In the drawings, Figure 1 is a front elevation of the boiler with the front doors removed and the cover of one of the headers broken away to expose the ends of the water-tubes. Fig. 2 is a detailed section showing the firebrick and iron sheet for closing the gap between the water-tubes and the side wall of the boiler. Fig. 3 is a vertical section on line 3 3 in Fig. 1 looking to the right. Fig. 4 is a rear elevation of the boiler with the rear doors removed. Fig. 5 is a longitudinal vertical section, on a larger scale, through one of the boiler-sections, the water-tubes being broken away at their centers and the headers brought nearer together. Fig. 6 is an elevation of a header having two covers, the connection with the steam-drum being made to the front wall of the header between the covered openings. Fig. 7 is a vertical cross-section through the water-tubes of two boiler-sections with headers made as in Fig. 6, showing the filling of the gaps between the groups of water-tubes by fire-bricks. Fig. 8 is a section on line 8 8 in Fig. 6 on a larger scale. Fig. 9 is a section at right angles to Fig. 8, and Figs. 10, 11, and 12 are views showing how the oblong covers are inserted into and removed from the headers.

The boiler is made up of water-tube sections, each composed of horizontal headers connected by inclined water-tubes and arranged one on top of another. The headers 13 14 of the water-tube sections are made of wrought-steel and may be formed of tubes crushed into rectangular shape in cross-section, Fig. 5. The inner or adjoining walls of each pair of headers are connected by water-tubes 15, which are expanded into openings in such walls. The outer wall of each header is provided with an oblong opening extending the entire length of the header opposed to the space occupied by the tubes on the inner wall and exposing all of said tubes. This opening is closed by a steam-tight cover 16, closing the opening from the inner side of the header by means of a tongue-and-groove joint provided with a packing-gasket. The cover is drawn to its seat and held in place by cross-bars or yokes 17, through which bolts from the cover pass, receiving upon their outer ends nuts. The cover 16 is removable through the opening in the header or introduced through said opening by tilting it sidewise, as illustrated in Figs. 10, 11, and 12, the depth of the chamber formed by the header and the space beyond the opening at each end and under the front wall of the header being sufficient to permit the cover to be tilted to such an angle and to be pushed under the front wall at one end far enough to permit its introduction into or removal from the header. By providing a single oblong opening in each header extending the entire length of the tube area the water-tubes of each section can be closely and uniformly spaced across the entire space through which the products of combustion pass, so that the entire space between the headers, except for a necessary margin at the ends and at the top and bottom edges, can be filled with water-tubes uniformly distributed and separated the minimum practical distance. The water-tubes can also be made of the desirable small size. The boiler is built up of a stack of these sections placed one upon another, one end of each section, preferably the rear end, being elevated above the other end so as to incline the water-tubes and cause the circulation of the water therethrough.

The corners of the boiler-frame are formed of vertical stand-pipes 18 19, preferably of rectangular form. These support and are connected with the steam-drums 20 21, the latter being the steam-drum for the next adjoining division of the boiler if the boiler is extended on that side. If the boiler is not extended on that side, the drum 21 will be omitted and the stand-pipes 19 will be connected with the drum 20, as shown in dotted lines in Fig. 1. The boiler-sections are supported between the stand-pipes, being preferably somewhat shorter than the distance between the front and rear stand-pipes so as to leave a space between the headers of the sections and the doors 22, closing the ends of the boiler for making connections between the boiler-sections and the steam-drum, and also so as not to have too great a length of unsupported tubing. At the front of the boiler the sections are connected with the water-space of steam-drum 20 by a pipe 23, preferably diminishing in size downwardly, which pipe has lateral branches connecting with openings in the covers 16 of the headers 13, the joints being made steam-tight by the employment of tongue-and-groove joints with gaskets. At the rear of the boiler the headers 14 are connected with the steam-space of the steam-drum 20, preferably by independent pipes 24, connected with the covers of the headers by steam-tight joints, as shown in Fig. 4.

The sides of the boiler are closed by rectangular pipes 25, which are inclined downwardly from the rear to the front of the boiler and are connected with and supported by the adjoining inner walls of the stand-pipes. Covered openings 26 are provided in the outer walls of the front or rear stand-pipes, or both, to expose the ends of the pipes 25 for cleaning. The boiler shown is one intended to be fired from both ends, the grate 34 extending the entire length between the front and rear stand-pipes. The end walls of the boiler below the headers of the boiler-sections are formed of vertical and horizontal rectangular tubes 27, which are connected together and to the stand-pipes so as to have with the pipes 25 a circulating connection with the steam-drum through the stand-pipes. These water-pipes 27 are arranged to leave firing-spaces 28 in the end walls, which spaces are covered by the fire-doors. (Not shown.)

To confine the products of combustion to the small spaces between the water-tubes, the larger spaces between the sides of the boiler-sections and the pipes 25, forming the sides of the boiler, are closed by fire-bricks 29 and iron sheets 30, Fig. 2, extending from the fire-bricks upwardly in contact with or close proximity to the water-tubes of the boiler-sections. Instead of providing each header with a single oblong covered opening for exposing the ends of the water-tubes and making the steam-drum connection with the cover the header may have two openings provided with oblong covers, leaving the center of the front wall of the header intact for forming or supporting a connection 31 for connecting with the pipe leading to the steam-drum, Figs. 6 to 9. With this construction the water-tubes will be divided into two groups separated at the center of the boiler-section and leaving a wider space at this point, which will be closed by a fire-brick 32. The boiler-sections have their rear headers preferably of such width as to rest one upon another and close the spaces between the headers at the rear of the boiler. At the front of the boiler, however, the headers are of less vertical width and are supported so as to leave spaces between them through which can be inserted devices, such as a steam-hose and brushes for cleaning the outer surfaces of the water-tubes. These spaces may be closed by removable covers 33, made of U-shaped plates of sheet-iron, which can be pushed into the spaces and will hold themselves in place. The headers at both ends of the boiler may be made narrow enough to leave cleaning-spaces between them.

There are various ways in which the circulation may be conveyed from the steam-drum to the headers and from the headers back again to the steam-drum, all that is necessary being that the descending column of water from the drum should be carried into the headers and the ascending column of water and steam should be carried out of the headers and back again to the drum without objectionable choking or retardation and without the formation of false currents in those portions where the mixture of steam and water rises to the drum. By giving each header or each of the lower headers requiring the most rapid circulation a separate riser-pipe 24 or connection with the drum which is no larger than necessary to avoid choke the most effective circulation will be secured. Instead of the upright pipes or risers connecting with the headers through their covers or front walls they may be connected so as to bring the water in at other points of the headers, or the ends of either or both sets of headers may be directly connected with the stand-pipes 18 19, which will be made large enough to convey the water.

The headers are shown as made in single pieces reaching clear across the furnace; but they may be made in the form of two or more separate headers butted end to end and having separate water connections with the circulation. In such a case it will probably be desirable to fill in the gaps between the tubes of the adjoining sections with fire-brick in order to confine the hot gases to the small spaces between the tubes.

The double-ended construction of boiler shown gives the maximum possible grate-surface in a given floor-space and dispenses with what would otherwise be the back walls of the boiler, and by contracting the upper part of the furnace water-tubes of an unobjectionable length can be used, and there can be included within the front doors or front walls of the boiler all the necessary pipes or conduits for the steam connections. By opening the front doors at one or at both ends and withdrawing the covers or pieces slipped in between the headers a steam-hose, such as is commonly used in Scotch boilers, can be introduced and the tubes properly blown off and cleaned frequently and without withdrawing the fires, an absolute necessity in order to maintain a high boiler efficiency in voyages of any length. By stacking the sections to any desired height the heat contained in the products of combustion may be extracted to any desired degree. If the waste heat after passing through the boiler-tubes is to be used for heating the air or for heating the feed-water, then fewer sections will be needed than if all the heat is to be taken out of the products by the boiler-tubes proper.

The products of combustion pass directly upward through the spaces between the water-tubes without being deflected by baffle-plates. The single covers, each exposing the ends of a large number of water-tubes, enable the tubes to be made of the desirable small size to give an extended area and at the same time to be placed so close together that the cross-sectional area of the space through which the gases pass has the desirable relation to the grate area, so that the gases are choked back and caused to be distributed uniformly and in thin streams over the tubes, which afford the desirable large heat-absorbing surface to effectively extract the heat from such gases.

What I claim is—

1. A water-tube boiler constructed with fire-doors at both ends, having water-tube sections located above the fire-box and of less length than the grate, substantially as set forth.

2. A water-tube boiler constructed with fire-doors at both ends, having water-tube sections located above the fire-box and of less length than the grate, in combination with water-circulating connections between the water-tube sections and the steam-drum located in the spaces at the ends of the water-tube sections without overhanging the fire-doors, substantially as set forth.

3. In a water-tube boiler, the combination of horizontal sections supported one above another and leaving spaces between the headers for cleaning the tubes externally, with removable covers fitting the spaces between the headers, substantially as set forth.

4. In a section for water-tube boilers, the combination with a header and water-tubes connected with its inner wall, of a water-circulating connection in the front wall of the header, and covered openings in said front wall on either side of said connection, substantially as set forth.

5. In a section for water-tube boilers, the combination with a header and water-tubes connected with its inner wall arranged in two groups separated by a gap intermediate the ends of the header, of a water-circulating connection in the front wall of the header opposite the gap between the groups of tubes, and covered openings in said front wall on each side of said connection, each opening exposing the ends of all the tubes of one group, substantially as set forth.

6. In a section for water-tube boilers, the combination with a header and water-tubes connected with its inner wall arranged in two groups separated by a gap intermediate the ends of the header, the tubes of each group being located in the close proximity described, of a water-circulating connection in the front wall of the header opposite the gap between the groups of tubes, and covered openings in said front wall on each side of said connection, each opening exposing the ends of all the tubes of one group, substantially as set forth.

7. In a section for water-tube boilers, the combination with a header and water-tubes connected with its inner wall arranged in two groups separated by a gap intermediate the ends of the header, the tubes of each group being located in the close proximity described, of a water-circulating connection in the front wall of the header opposite the gap between the groups of tubes, covered openings in said front wall on each side of said connection, each opening exposing the ends of all the tubes of one group, and means for closing the gap between the groups of tubes to prevent the passage of the products of combustion therethrough, substantially as set forth.

8. In a water-tube steam-boiler, the combination with a long fire-box having fire-doors at each end, of a number of water-tube sections arranged above the fire-box and of less length than the grate, and water-leg end walls inclined inwardly to the ends of the water-tube sections, substantially as set forth.

This specification signed and witnessed this 15th day of February, 1904.

CHARLES G. CURTIS.

Witnesses:
JNO. ROBT. TAYLOR,
JOHN L. LOTSCH.